Patented Feb. 8, 1938

2,107,935

UNITED STATES PATENT OFFICE 2,107,935

ULTRAVIOLET TRANSMITTING GLASSES

Johann Ensz and Magdalene Hüniger, Berlin-Charlottenburg, Germany, assignors to General Electric Company, a corporation of New York No Drawing. Application October 31, 1933, Serial No. 696,112. In Germany November 11, 1932

2 Claims. (Cl. 252—8)

The present invention relates to ultra-violet transmitting glasses generally and more particularly the invention relates to processes for producing such glasses.

The containers of lamps, such as gaseous electric discharge lamps, should have ultra-violet transmitting characteristics similar to those of quartz where such lamps are used for therapeutic purposes. As quartz containers are expensive to manufacture ultra-violet transmitting glasses are used for the containers whenever possible. Ultra-violet transmitting glass is also useful in other connections as in optical instruments and for window glass. Such glasses now available are frequently unsatisfactory for particular purposes and this is due to a great extent to the fact that the glass contains a harmful amount of ultra-violet ray absorbing impurities, such as the compounds of titanium and iron.

Hydrochloric acid used to purify the sands and quartzes used in the manufacture of such glasses to reduce the content of these impurities in the glass to the point that the ultra-violet transmission characteristics of the glass is substantially unaffected by such impurities is not effective since the sands contain the iron and titanium compounds in such amount and in such form that their removal is not accomplished with this acid.

The object of the present invention is to remove the ultra-violet ray absorbing impurities in the materials used in the manufacture of ultra-violet ray transmitting glasses to the extent that the ultra-violet transmitting characeristics of the glass is substantially unaffected by these impurities. A further object of the invention is to provide a process by which the ultra-violet ray absorbing impurities in the raw materials used in the manufacture of the glass, such as the sands and/or quartzes, amount to less than 0.005% of the contents of the glass. The invention further consists in the new and novel features of operation and the new and original arrangements and combinations of steps in the process hereinafter described and more particularly set forth in the claims.

The invention attains its objects by treating the sands and/or quartzes used in the manufacture of the glass with concentrated sulphuric acid when said sands and/or quartzes are in a finely divided state. We have proven that concentrated sulphuric acid dissolves the iron and titanium compounds in the raw materials comprising silicic acid. It is possible by treating the raw materials with concentrated sulphuric acid to limit the ultra-violet ray absorbing iron and titanium compounds in the glass to less than 0.005% without adding reducing agents, such as zinc or carbon compounds, to the glass melts which, of course, greatly simplifies the manufacture of such glasses.

We have found further that good results are obtained when the treatment of the raw materials with concentrated sulphuric acid is carried on at a temperature of from 250° to the boiling point of sulphuric acid. Particularly good results are obtained when the treatment is carried on under pressure at a temperature higher than the boiling temperature of sulphuric acid.

It is advantageous to limit the amount of sulphuric used so that the mixture of sulphuric acid and sand has the consistency of thick paste. The mixture can then be brought to the required temperature with a minimum amount of heat and the sulphuric acid vapors are reduced to a minimum.

After the raw material has been treated with the concentrated sulphuric acid it is washed with dilute sulphuric acid to prevent the dissolved titanium and iron compounds from precipitating again and from mixing with the sand.

Oxidizing agents, such as hydrogen peroxide are added to the dilute sulphuric acid, when desired, to keep the titanium compounds in solution during the washing process. The addition of the hydrogen peroxide to the dilute sulphuric acid has the additional advantage that it affords a means of testing the content of titanium compound in the liquid. When the yellow color of the liquid has disappeared the requisite degree of purity of the raw material being treated has been attained. It is, of course, possible to control the process automatically by using a colorimeter the operation of which is controlled by the color of the liquid.

In order to prevent the nullification of the above process during the subsequent melting of the purified sand or quartz with the other glass constituents it is advisable to remove the iron and titanium compounds from these other constituents. This can be accomplished by a process of recrystallization or reprecipitation of these materials, processes well known to those skilled in the art. It will be understood of course that the vessels and the articles which come in contact with the glass during the manufacture thereof should be free from iron and titanium.

Although we have shown and described and have pointed out in the annexed claims certain novel features of the invention, it will be understood that various omissions, substitutions and changes in the several steps of the process and in its operation may be made by those skilled in the art without departing from the spirit of the invention.

What we claim as new and desire to secure by Letters Patent of the United States is:—

1. A process for producing the silicic acid useful in the manufacture of ultra-violet transmitting glasses which consists in treating the finely divided raw materials containing titanic and iron oxides with concentrated sulphuric acid to dissolve the titanium and iron oxides and subsequently washing the treated raw materials with dilute sulphuric acid mixed with an oxidizing agent which readily gives up its oxygen to prevent the dissolved titanium and iron compounds from precipitating again and from mixing with the raw materials.

2. A process for producing the silicic acid useful in the manufacture of ultra-violet transmitting glasses which consists in treating the finely divided raw materials containing titanic and iron oxides with concentrated sulphuric acid to dissolve the titanium and iron oxides and subsequently washing the treated raw materials with dilute sulphuric acid mixed with hydrogen peroxide to prevent the dissolved titanium and iron compounds from precipitating again and from mixing with the raw materials.

JOHANN ENSZ.
MAGDALENE HÜNIGER.